US008559778B2

(12) United States Patent  
Hurley et al.

(10) Patent No.: US 8,559,778 B2  
(45) Date of Patent: Oct. 15, 2013

(54) HIGH DENSITY MULTIFIBER INTERCONNECT CABLE

(75) Inventors: William C. Hurley, Hickory, NC (US); Samuel D. Navé, Newton, NC (US)

(73) Assignee: Corning Cable Systems LLC, Hickory, NC (US)

( * ) Notice: Subject to any disclaimer, the term of this patent is extended or adjusted under 35 U.S.C. 154(b) by 610 days.

(21) Appl. No.: 12/765,475

(22) Filed: Apr. 22, 2010

(65) Prior Publication Data  
US 2011/0262088 A1 Oct. 27, 2011

(51) Int. Cl.  
*G02B 6/44* (2006.01)

(52) U.S. Cl.  
USPC .......................................................... 385/110

(58) Field of Classification Search  
None  
See application file for complete search history.

(56) References Cited

U.S. PATENT DOCUMENTS

| | | | |
|---|---|---|---|
| 4,038,489 A * | 7/1977 | Stenson et al. | 174/70 R |
| 4,191,488 A | 3/1980 | Bickerton | 403/370 |
| 4,804,245 A | 2/1989 | Katayose et al. | 350/96.23 |
| 5,087,110 A | 2/1992 | Inagaki et al. | 385/110 |
| 5,218,659 A | 6/1993 | Schneider | 385/110 |
| 5,289,556 A | 2/1994 | Rawlyk et al. | 385/112 |
| 5,952,615 A | 9/1999 | Prudhon | 174/113 C |
| 6,248,954 B1 * | 6/2001 | Clark et al. | 174/113 R |
| 6,297,454 B1 | 10/2001 | Gareis | 174/113 C |
| 6,356,836 B1 | 3/2002 | Adolph | 701/208 |
| 6,477,304 B2 * | 11/2002 | Dallas et al. | 385/110 |
| 6,596,944 B1 | 7/2003 | Clark et al. | 174/113 C |
| 6,826,338 B2 | 11/2004 | Matsuyama | 385/110 |
| 2005/0244115 A1 * | 11/2005 | Bocanegra et al. | 385/110 |
| 2007/0269171 A1 | 11/2007 | Keller et al. | 385/112 |

FOREIGN PATENT DOCUMENTS

| | | |
|---|---|---|
| DE | 4421456 A1 | 12/1995 |
| GB | 2123978 A | 2/1984 |

OTHER PUBLICATIONS

European Search Report, Application No. 11163420.0, Jul. 2, 2013, pp. 1-6.

* cited by examiner

Primary Examiner — Sarah Hahm (57) ABSTRACT

A fiber optic cable with first and second cavities accommodating separate groups of fibers. Arranging the optical fibers in separate cavities allows the fibers to be distinguished from one another without requiring secondary marking indicia such as stripes on the fibers. The cable jacket can be extruded such that the cavities are formed integrally in the jacket during extrusion.

19 Claims, 5 Drawing Sheets

HIGH DENSITY MULTIFIBER INTERCONNECT CABLE

BACKGROUND

The present disclosure relates to fiber optic cables and more specifically to fiber optic cables having a structure that segregates groups of optical fibers within the cable.

In a fiber optic network, numerous connections between fiber optic cables are required. The present standard in the art utilizes male and female industry-standard MTP connectors, which employ precision guide pins to align the internal fibers of the fiber optic cable, when connecting fiber optic cables. An MTP connector typically connects a multi-fiber cable having twelve optical fibers.

Individual fibers in a multi-fiber cable are often distinguished from one another by color-coded jackets or buffers and an identification scheme has been developed to allow for rapid identification of the optical fibers. This is important because connecting an MTP connector correctly to a multi-fiber cable requires precise knowledge of the connection scheme of the optical fibers in the cable. The current color identification scheme includes 12 distinct colors that are used to identify the fibers.

With the amount of data to be transmitted increasing, data centers are now using fiber optic cables containing, for example, 24 optical fibers and 24 fiber MTP optical connectivity hardware to connect the 24 fiber cable to various devices. The 24 fiber cable improves efficiency as well as data transmission density and bandwidth. For cables having more than twelve fibers, the standard 12 color code must repeat itself. Thus, in the case of a 24 fiber cable, there are two optical fibers identified with each of the colors. The two groups can be distinguished by adding, for example, a stripe or some other identifying indicia to one set of fibers. Applying a dash or stripe to the fibers, however, requires operating at a low line speed, rendering the manufacturing process less efficient.

Alternatively, fiber groups can be distinguished by bundling one of the fiber groups, such as by wrapping the group in a binder thread. However, the thread binder can untwist while removing the cable jacket so that the installer can no longer distinguish between the fiber groups.

SUMMARY

In one embodiment, a fiber optic cable comprises an elongated jacket of continuous cross-section, a first cavity in the jacket and extending therealong, a first group of optical fibers located within the first cavity, a second cavity in the jacket and extending therealong, a second group of optical fibers located within the second cavity, and at least one strength member within and extending along the jacket, wherein the jacket is extruded such that the first and second cavities are formed during extrusion of the jacket. Providing separate cavities for the respective groups of fibers distinguishes the groups from each other, for example, during installation of a connector on an end of the cable. Extruding the cable jacket as a unitary piece is an efficient way to segregate the first and second fiber groups in their respective cavities. Each group of fibers can include twelve fibers, with each fiber in the first group having a corresponding fiber in the second group of identical color and appearance, without the requirement of additional identifying indicia.

According to another embodiment, a fiber optic cable comprises a jacket, a cavity within the jacket extending therealong, an insert within and extending along the cavity, the insert comprising a central partition and a pair of end portions connected to the central partition, the central partition dividing the cavity into a first region and a second region, a first plurality of optical fibers grouped together in a first group in the first region, a second plurality of optical fibers grouped together in a second group in the second region, and at least one strength member within and extending along the jacket. The insert separates the respective groups of fibers to that they can be distinguished, for example, during installation of a connector on an end of the fiber optic cable.

According to yet another embodiment, a malleable tape can be used to form first and second regions within a fiber optic cable.

According to the present embodiments, a trunk or breakout cable can be formed using a plurality of any of the cables disclosed in this specification. The individual cables can be wrapped or stranded around a strength member, and enclosed within an outer jacket.

It is to be understood that both the foregoing summary and the following detailed description are merely exemplary of preferred embodiments, and are intended to provide an overview or framework to understanding the nature and character of the claims.

BRIEF DESCRIPTION OF THE DRAWINGS

The components of the following figures are illustrated to emphasize the general principles of the present disclosure and are not necessarily drawn to scale. Reference characters designating corresponding components are repeated as necessary throughout the figures for the sake of consistency and clarity.

DETAILED DESCRIPTION

The fiber optic cable constructions disclosed herein segregate at least two optical fiber groups, wherein each group contains a plurality of optical fibers. The plurality of optical fibers may number twelve. Generally, the cable constructions disclosed herein as exemplary embodiments comprise two segregated groups of twelve optical fibers of the same color and appearance. The cross-sections in this specification are taken on a plane perpendicular to the length of the cables.

Figure 1:
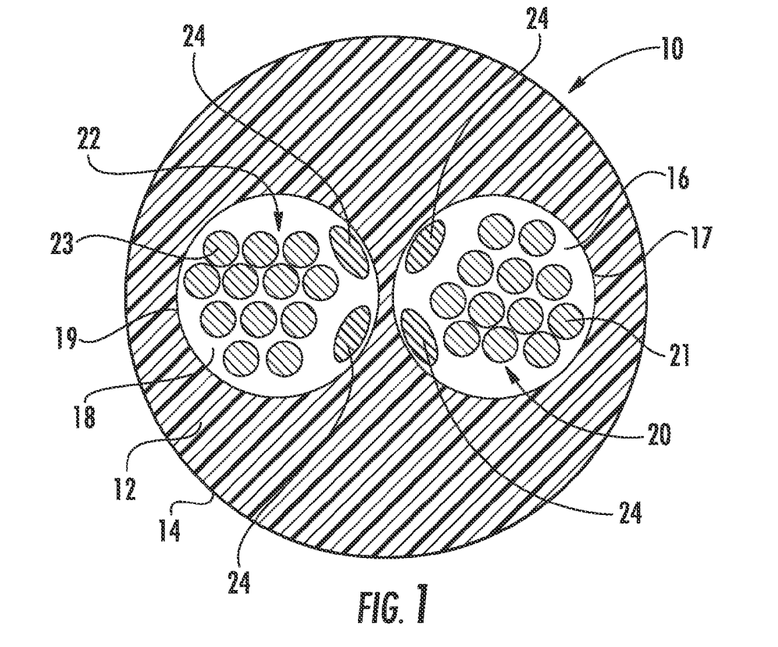
FIG. 1 is schematic cross-sectional view of a fiber optic cable according to a first embodiment.

FIG. 1 is a schematic cross-sectional view of a fiber optic cable 10 according a first embodiment. The fiber optic cable 10 has an elongated jacket 12 that surrounds a first cavity or first lumen 16 and a second cavity or second lumen 18 with both cavities extending along the length of the jacket 12. A first plurality 20 of optical fibers 21 form a first group 20 that extends along the length of the first cavity 16. A second plurality 22 of optical fibers 23 forms a second group 22 that extends along the length of the second cavity 18. The first plurality 20 of optical fibers 21 may be bundled together and the second plurality 22 of optical fibers 23 may be bundled together. The first plurality 20 of optical fibers 21 and the second plurality 22 of optical fibers 23 are separated from each other by a structure or barrier, which in this case is a portion of the jacket 12 extending between the cavities 16, 18. The cable 10 can also include one or more strength members 24 which may be arranged in one or both of the first cavity 16 and the second cavity 18 and extends the length of the respective cavities.

The cable 10 has a generally circular cross section 14. The cross-section 14 may have a diameter less than or equal to about 4.0 mm, or less than or equal to 3.3 mm. The first cavity 16 and the second cavity 18 also have circular cross-sections 17, 19, respectively. It is not required, however, that they be circular in cross-section or that they have the same cross-sectional shape. The cross-sectional area of the first cavity 16 and the second cavity 18 each may be at least 1.10 millimeters squared ($mm^2$) and in some embodiments each cross-sectional area may be at least 1.25 $mm^2$. A cavity cross-sectional area of 1.25 $mm^2$ provides a packing density of about 70% when twelve optical fibers are accommodated in each cavity. If for example, eight fibers are provided in each cavity, the cavities may each have a cross-sectional area of at least 0.85 $mm^2$. Generally, the strength members 24 may be arranged toward the center of the cable 10 and each cavity 16, 18 can include one, two, or more strength members 24.

Figure 2:
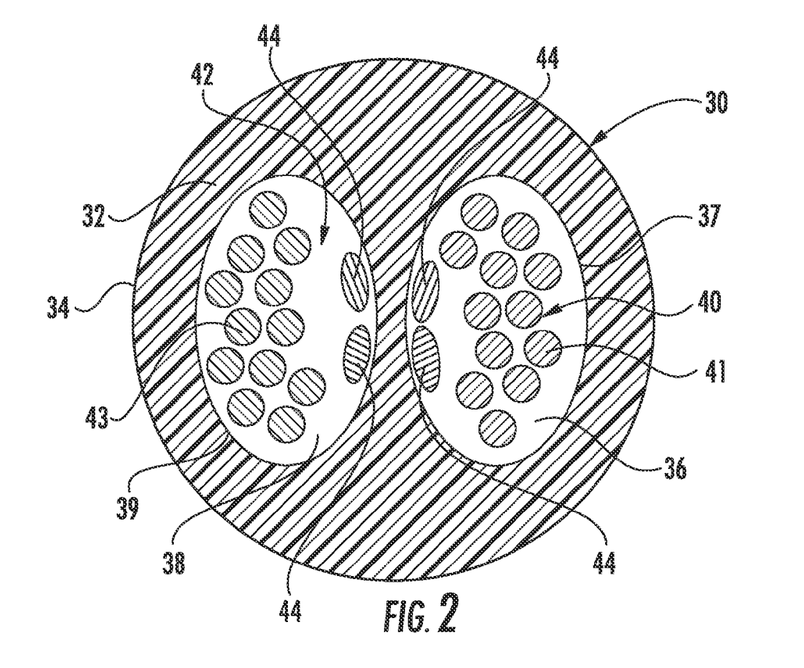
FIG. 2 is schematic cross-sectional view of a fiber optic cable according to a second embodiment.
Figure 3:
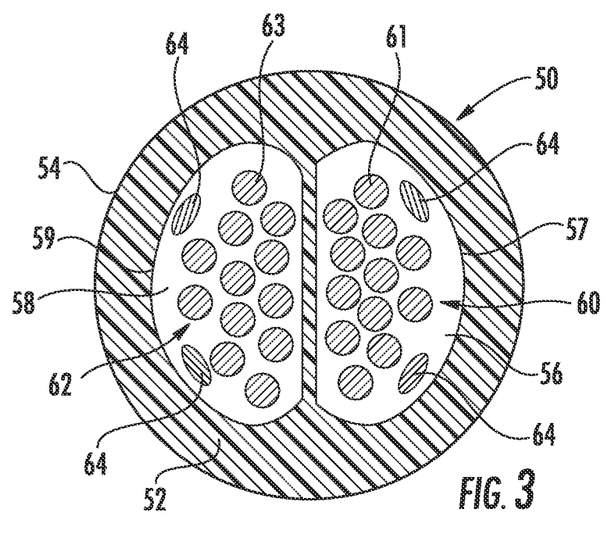
FIG. 3 is schematic cross-sectional view of a fiber optic cable according to a third embodiment.

FIGS. 2 and 3 are schematic cross-sectional views of fiber optic cable 30, 50 according to second and third embodiments, respectively. The cables 30, 50 have respective generally circular cross-sections 34, 54. The cross-sections 34, 54 may have a diameter of less than or equal to about 3.3 mm. The first cavities 36, 56 and the second cavities 38, 58 each have non-circular cross-sections 37, 39, and 57, 59 respectively. The cross-sectional area of the first cavity 36, 56 and the second cavity 38, 58 each may be at least 1.10 $mm^2$ and in some embodiments may be at least 1.25 $mm^2$. Generally, for the cable 30, the strength members 44 may be arranged toward the center of the cable 30 and each cavity 36, 38 can have one or more strength members 44. Four strength members 64 are shown in the exemplary cable 50 with the strength members 64 arranged at the peripheries of the cavities 56, 58.

Figure 4:
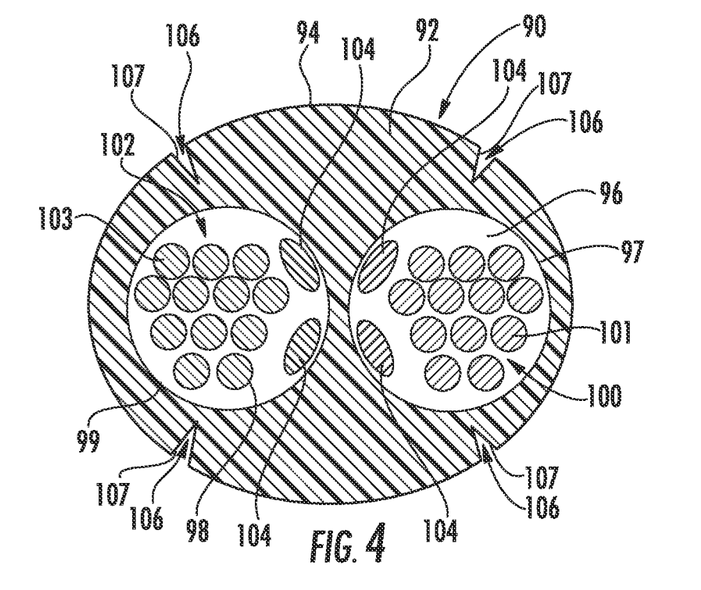
FIG. 4 is schematic cross-sectional view of a fiber optic cable according to a fourth embodiment.

FIG. 4 is a schematic cross-sectional view of the fiber optic cable 90 of non-circular cross-section 94. The cross-section 94 may be elliptical or oval in shape, and may have an area less than about 10 $mm^2$. An oval or elliptical cross-section 94 may maintain cable 90 robustness while also minimizing the size and cost of the cable 90. The oval or elliptical cross-section 94 can be designed to provide the cable 90 with a preferential bend direction. Furthermore, the cross-section 94 may provide improved mechanical performance with regards to crush and impact since the cable 90 may be oriented in the preferential bend direction when being crushed. A crush load applied in the vertical direction in FIG. 4, for example, may be borne along the central portion of the cable, while the optical fibers are generally disposed to the sides of the cable. The aspect ratio of the elliptical cross-section 94 may range from about 1:1 to about 3.6:2.6, where aspect ratio is a ratio of the measure of a major or largest axis of the ellipse to a minor or smallest axis of the ellipse. An ovality for the cross-section 94 may be at least 0.8, where ovality is a ratio of the minor axis of the oval to the major axis of the oval. While the terms "ellipse" and "oval" are used to describe various embodiments of this specification, the cross-sectional shapes need not necessarily follow these precise geometrical constructs, but instead may simply approximate the shape or appearance of a true "ellipse" or "oval."

The exemplary first cavity 96 and the second cavity 98 have generally circular cross-sections 97, 99, respectively. The cross-sectional area of the first cavity 96 and the second cavity 98 each may be at least 1.10 $mm^2$ and in some embodiments at least 1.25 $mm^2$. Each cavity 96, 98 can include one or more strength members 104 that can be oriented toward the inner portion of the cavities. The fiber optic cable 90 can include one or more optional access features 106 formed in and extending along the periphery of the jacket 92. The access features 106 are configured to facilitate opening selected portions of the jacket 92 to allow access to one or both of the fiber groups 100, 102. The access features 106 in the illustrated embodiment have the form of a partial slit or notch 107 that extends along the length of the jacket 92. As shown in FIG. 4, a pair of slits 106 can be arranged at each end of the cable 90 so that a section of the jacket 92 between the slits can be removed, allowing access to the fiber groups in either of the cavities 96, 98. The slits 106 extend a inwardly from the jacket 92 exterior.

Figure 5:
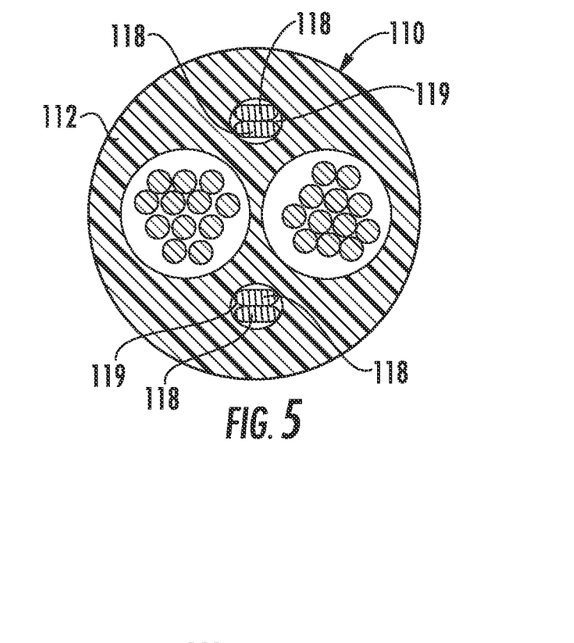
FIG. 5 is schematic cross-sectional view of a fiber optic cable according to a fifth embodiment.
Figure 6:
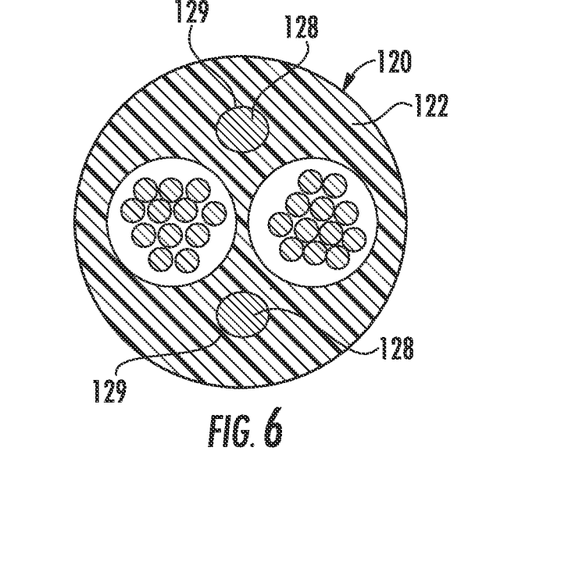
FIG. 6 is schematic cross-sectional view of a fiber optic cable according to a sixth embodiment.

FIG. 5 is a schematic cross-sectional views of a fiber optic cable 110. The cable 110 is substantially identical to the cable illustrated in FIG. 1, except that the cable jacket 112 includes strength members 118 extending longitudinally through cavities 119 in the cable jacket. As illustrated in FIG. 5, the strength members 118 are aramid yarns arranged loosely in the cavities 119. FIG. 6 illustrates an alternative embodiment of a cable 120 substantially identical to that of FIG. 5, where the cable jacket 122 includes strength members 128 embedded within cavities 129. In FIG. 6, the cable jacket 112 is extruded around the strength members 128 so that that the aramid yarns adhere to the polymer of the jacket 112. Strength members 118, 128 as shown in FIGS. 5 and 6 can be incorporated into the jackets of any of the embodiments shown in FIGS. 1-4.

According to the embodiments disclosed in FIGS. 1-6, the first and second cavities are defined by cable jackets that are a single, continuous (or, not formed from separate pieces or materials), uniform, polymer element extruded in a one-pass process. It is to be understood, however, that coextrusion methods may allow the use of different polymer materials to form a continuous polymer jacket in a one-pass process. The first cavities can have the same or similar cross-sectional shapes as the second cavities, and can be arranged on each side of the cable jackets so that the cables are symmetric about a central plane. In the oval or elliptical embodiments of FIGS. 4 and 5, the central plane can be defined along the minor axis of the ellipse. In the illustrated embodiments, the central plane is a plane of symmetry dividing the cables in half and passing through the barrier between the cavities (corresponding to vertical bisection lines in the figures), so that the cavities lie on opposite sides of the central plane. The individual fibers in the first groups can contact the portion of the jacket defining the first cavities, and the fibers in the second groups can contact the portion of the jacket defining the second cavities.

Figure 7:
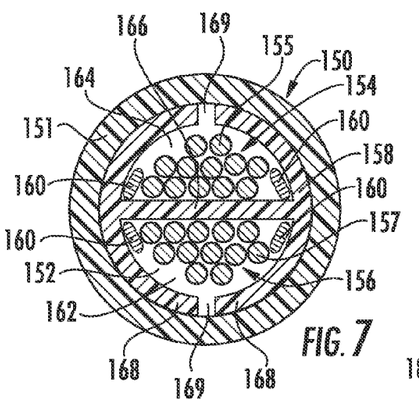
FIG. 7 is schematic cross-sectional view of a fiber optic cable according to a seventh embodiment.
Figure 8:
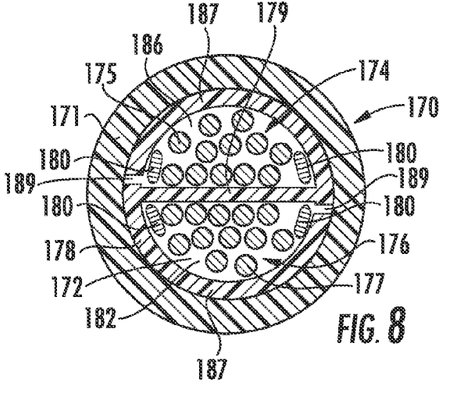
FIG. 8 is schematic cross-sectional view of a fiber optic cable according to an eighth embodiment.

FIGS. 7 and 8 are schematic cross-sectional views of fiber optic cables 150, 170 according to embodiments seven and eight. The cables 150, 170 are of similar construction with common features, and thus will be discussed collectively. The fiber optic cable 150, 170 has a jacket 151, 171 that surrounds a cavity 152, 172, extending along the length of the jacket 151, 171. A first plurality 154, 174 of optical fibers 155, 175 form a first group 154, 174 that extends along the length of the cavity 152, 172. A second plurality 156, 176 of optical fibers 157, 177 forms a second group 156, 176 that extends along the length of the cavity 152, 172. The first groups and the second groups can be optionally bundled. The first fiber group 154, 174 and the second fiber group 156, 176 are separated from each other by a structure or barrier 158, 178. The cable 150, 170 can include one or more strength members 160, 180, which may be arranged in the cavity 152, 172 and extending the length of the cavity.

Referring specifically to FIG. 7, the barrier 158 divides the cavity 152 into two regions 162, 164 and physically separates the first fiber group 154 from the second fiber group 156. The barrier 158 can be an insert, such as a plastic piece into which fibers are inserted before the jacket 151 is extruded thereover. The insert 158 has a central partition 166 and two curved end portions 168 extending from opposite ends of the partition 166. The curved end portions 168 can be arcuate and can conform to an inner periphery of the jacket 151 over an arcuate distance. Gaps 169 are present between adjacent ends of the end portions 168. During manufacture, the gaps 169 between the end portions 168 can be widened to allow insertion of optical fibers into the insert 158. Each end portion 168 can conform to at least 50 degrees of arc of the inside of the jacket 151.

Referring specifically to FIG. 8, the barrier 178 separates the first group 174 from the second group 176 and divides the cavity 172 into two regions 182, 186. The barrier 178 can be an insert, such as a plastic piece into which fibers are inserted before the jacket 171 is extruded thereover. The insert 178 has a central partition 179 and two curved end portions 187 extending from opposite ends of the partition 179. The curved end portions 187 can be arcuate and can conform to an inner periphery of the jacket 171 over a distance at least 50 degrees of arc. Gaps 189 allow insertion of optical fibers during manufacture.

Figure 9:
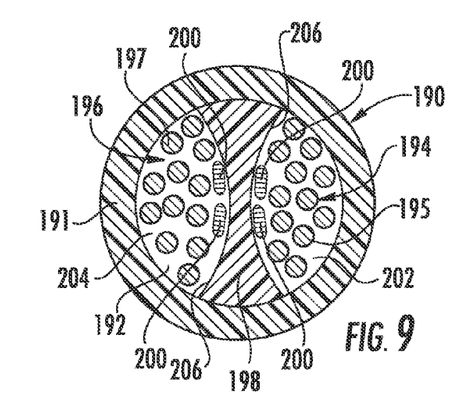
FIG. 9 is schematic cross-sectional view of a fiber optic cable according to an ninth embodiment.

FIG. 9 is a schematic cross-sectional view of a fiber optic cable 190 having an elongated jacket 191 that surrounds a cavity 192. A first plurality 194 of optical fibers 195 form a first fiber group 194 that extends along the length of the cavity 192. A second plurality 196 of optical fibers 197 forms a second fiber group 196 that extends along the length of the cavity 192. A structure or barrier 198 partitions the cavity into two regions 202, 204 and physically separates the first group of fibers 194 from the second group of fibers 196. The cable 190 can include one or more strength members 200 arranged in the cavity 192 and extending the length of the cavity. The exemplary barrier 198 is a plastic insert that bisects the cavity 192 so that a central plane of the cable 190 bisects the insert. The barrier 198 has opposed, inwardly curved concave walls 206 that face the groups of optical fibers 194, 196.

Figure 10:
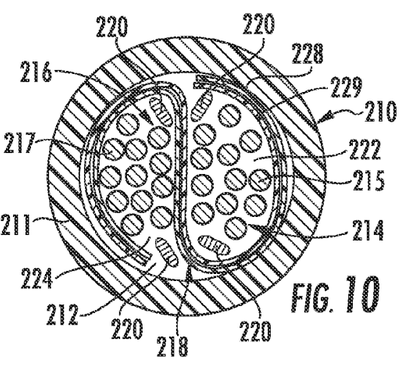
FIG. 10 is schematic cross-sectional view of a fiber optic cable according to a tenth embodiment.

FIG. 10 is a schematic cross-sectional view of a fiber optic cable 210 having an elongated jacket 211 that surrounds a cavity 212 extending along the length of the jacket 211. A first plurality 214 of optical fibers 215 form a first group 214 and a second plurality 216 of optical fibers 217 forms a second group 216 that extends along the length of the cavity 212. One or both groups 214, 216 can be bundled. A barrier 218 partitions the cavity into two regions 212, 214 and physically separates the first group of fibers 214 from the second group of fibers 216. The cable 210 can include on or more strength members 220 extending the length of the cavity. In FIG. 10, the barrier 218 has the form or a malleable tape dividing the cavity 212 into the two regions 212, 214. During manufacture, the tape 218 can be open to allow insertion of optical fibers, and then substantially closed to allow extrusion of the jacket 211 around the tape 218. Opposites sides 228, 229 of the tape 218 can be tinted different colors to identify the fibers in each region 212, 214. The malleable tape 218 can be a plastic material capable of deformation within the cable jacket 211. Malleable materials such as, for example, polytetrafluoroethylene (PTFE), and commercially available materials such as Teflon®, can be used to form the tape 218.

In the embodiments described in this specification, a matrix material having a consistency of, for example rubber cement, may be used to bundle each of the first groups and/or the second groups of optical fibers. The matrix material may be an ultra-violet curable matrix material. To distinguish between the two groups of optical fibers, a colored or tinted matrix material may be used for one, or both of the groups.

Figure 11:
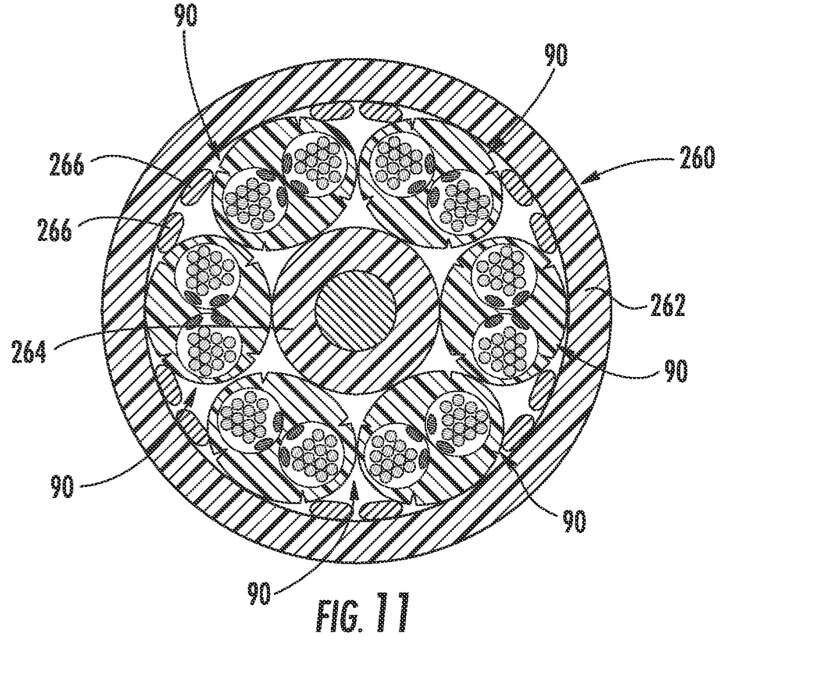
FIG. 11 is schematic cross-sectional view of a fiber optic trunk cable.

FIG. 11 is a schematic cross-sectional view of a fiber optic trunk or breakout cable 260 having a polymer jacket 262 surrounding six cables 90 as shown in FIG. 4. The trunk cable 260 may, however, comprise a plurality of any of the fiber optic cables 10, 30, 50, 110, 120, 150, 170, 190, 210. The trunk cable 260 also has a central strength member 264, around which a plurality of cables may be stranded or otherwise arranged on the periphery of the strength member 264. The illustrated central member 264 is a coated glass-reinforced plastic (GRP). The trunk cable 260 can also include additional strength members 266 for added tensile strength.

According to the embodiments disclosed in this specification, during cable access and connectorization of 24f cables, for example, the installer can easily distinguish between fibers 1-12 in the first fiber group of fibers from fibers 13-24 in the second fiber group, without requiring additional marking indicia for the second group of fibers. Accordingly, for each fiber in the first group, there can be a fiber in the second group of identical appearance. The first and second fiber groups described in this specification can each accordingly include, for example, twelve optical fibers in the 12-color sequence of blue, orange, green, brown, slate, white, red, black, yellow, purple, rose, and aqua, without either group of fibers requiring additional identifying indicia such as stripes, etc. According to one embodiment, a fiber optic cable according to the present embodiments can include 24 fibers of 0.25 mm outer diameter and the cable outer diameter can be approximately 3.3 mm or less. Skew performance of the optical fibers for the cable disclosed herein may be at least 3.75 Pico-seconds per meter (ps/m) to satisfy the requirement for high data rate applications.

Although the strength members disclosed herein are illustrated at particular locations within a cable (i.e. the cable center, toward the cable periphery), the strength members may be disposed within a cable at any location. The strength members may be strands of aramid (e.g., Kevlar®) yarn or other appropriate high tensile strength materials.

The cable jackets disclosed herein may be manufactured from any suitable material and may depend on the particular application and/or application space. For example, polyvinylchloride (PVC), chlorinated polyethylene (CPE) or flame retardant polyethylene (FRPE) may be used and fluoropolymers such as polyvinylidene fluoride (PVDF), fluorinated ethylene propylene (FEP), polytetrafluoroethylene (PTFE), ethylene tetrafluoroethylene (ETFE) may be used as well. Depending on the burn requirements, nylons, polyesters, polyethylene (PE), or polypropylene (PP) may be used.

Fiber optic cables having a dual cavity design (e.g. cables 10, 30, 50, 90, 110) may be extruded in a fashion similar to known zipcord cables; however, a round die may be necessary to fabricate the desired cross-sectional shape. Furthermore, the shape of a die tip may determine the cross-sectional shape of the cavity. The size of each cavity can be extruded so that it is sufficient to accommodate twelve colored fibers and at least two ends of aramid yarn.

It will be apparent to those skilled in the art that various other modifications and variations can be made without departing from the spirit or scope of the present disclosure.

We claim:

1. A fiber optic cable comprising:
an elongated polymer jacket of continuous cross-section;
a first cavity in the jacket and extending therealong;
a first group of optical fibers located within and extending along the first cavity;
a second cavity in the jacket and extending therealong, the second cavity being separate from the first cavity;
a second group of optical fibers located within and extending along the second cavity; and
at least one strength member within and extending along the jacket,
wherein a central plane extends between the first cavity and the second cavity, wherein a cross-section of the jacket is symmetric about the central plane, and wherein the jacket includes a barrier that separates the first and second cavities, the central plane passing through the barrier, whereby the cable structure provides improved mechanical performance with regard to crush such that a crush load may be borne along the central plane of the cable,
wherein the first group of optical fibers comprises at least six optical fibers and the second group of optical fibers comprises at least six optical fibers, wherein the first and second cavities each has a cross-sectional area greater than 0.85 square millimeters, and wherein for each optical fiber in the first group there is a corresponding optical fiber in the second group of the same color and appearance.

2. A fiber optic cable comprising:
an elongated polymer jacket of continuous cross-section;
a first cavity in the jacket and extending therealong;
a first group of optical fibers located within and extending along the first cavity;
a second cavity in the jacket and extending therealong, the second cavity being separate from the first cavity;
a second group of optical fibers located within and extending along the second cavity; and
at least one strength member within and extending along the jacket,
wherein a central plane extends between the first cavity and the second cavity, wherein a cross-section of the jacket is symmetric about the central plane, and wherein the jacket includes a barrier that separates the first and second cavities, the central plane passing through the barrier, whereby the cable structure provides improved mechanical performance with regard to crush such that a crush load ma be borne along the central plane of the cable,
wherein the first group of optical fibers comprises at least twelve optical fibers and the second group of optical fibers comprises at least twelve optical fibers, wherein the first and second cavities each has a cross-sectional area greater than 1.10 square millimeters, and wherein the at least one tensile strength member comprises a tensile yarn grouped with at least one of the groups of optical fibers.

3. A fiber optic cable comprising:
an elongated polymer jacket of continuous cross-section;
a first cavity in the jacket and extending therealong;
a first group of optical fibers located within and extending along the first cavity;
a second cavity in the jacket and extending therealong, the second cavity being separate from the first cavity;
a second group of optical fibers located within and extending along the second cavity; and
at least one strength member within and extending along the jacket,
wherein a central plane extends between the first cavity and the second cavity, wherein a cross-section of the jacket is symmetric about the central plane, and wherein the jacket includes a barrier that separates the first and second cavities, the central plane passing through the barrier, whereby the cable structure provides improved mechanical performance with regard to crush such that a crush load may be borne along the central plane of the cable,
wherein the first group of optical fibers comprises at least twelve optical fibers and the second group of optical fibers comprises at least twelve optical fibers, wherein the first and second cavities each has a cross-sectional area greater than 1.10 square millimeters, and wherein a cross-sectional width of the jacket is 4.0 millimeters or less.

4. A fiber optic cable comprising:
an elongated polymer jacket of continuous cross-section;
a first cavity in the jacket and extending therealong;
a first group of optical fibers located within and extending along the first cavity;
a second cavity in the jacket and extending therealong, the second cavity being separate from the first cavity;
a second group of optical fibers located within and extending along the second cavity; and
at least one strength member within and extending along the jacket,
wherein a central plane extends between the first cavity and the second cavity, wherein a cross-section of the jacket is symmetric about the central plane, and wherein the jacket includes a barrier that separates the first and second cavities, the central plane passing through the barrier, whereby the cable structure provides improved mechanical performance with regard to crush such that a crush load may be borne along the central plane of the cable,
wherein the first group of optical fibers comprises at least twelve optical fibers and the second group of optical fibers comprises at least twelve optical fibers, wherein the first and second cavities each has a cross-sectional area greater than 1.10 square millimeters, and wherein for each optical fiber in the first group there is a corresponding optical fiber in the second group of the same color and appearance.

5. A fiber optic cable comprising:
an elongated polymer jacket;
a first cavity in the jacket and extending therealong and having a cross-sectional area of at least 0.85 square millimeters;
a first group of twelve optical fibers located within and extending along the first cavity;
a second cavity in the jacket and extending therealong and having a cross-sectional area of at least 0.85 square millimeters, the second cavity being separated from the first cavity by portion of the jacket; and
a second group of twelve optical fibers located within and extending along the second cavity, wherein the polymer jacket is extruded such that the first and second cavities are formed during extrusion of the polymer jacket, the optical fibers in the first cavity can contact a portion of the jacket defining the first cavity, and for each optical fiber in the first group there is a corresponding optical fiber in the second group of the same color and appearance.

6. The cable of claim 5, further comprising at least one aramid strand extending along the length of the cable.

7. A fiber optic cable comprising:

an elongated jacket;

a cavity within the jacket extending therealong;

a malleable tape within and extending along the cavity, the tape dividing the cavity into a first region and a second region, wherein the malleable tape comprises one side of a first color and an opposite side of a second color;

a first group of optical fibers in the first region;

a second group of optical fibers in the second region, the tape physically separating the first group from the second group; and at least one strength member within and extending along the jacket.

8. The fiber optic cable of claim 7, wherein the first group of optical fibers comprises at least twelve optical fibers and the second group of optical fibers comprises at least twelve optical fibers.

9. The fiber optic cable of claim 8, wherein for each optical fiber in the first group there is one corresponding optical fiber in the second group of identical color and appearance.

10. The fiber optic cable of claim 8, wherein the malleable tape comprises plastic.

11. A fiber optic cable comprising:

an elongated polymer jacket, comprising:

a first cavity formed in the jacket and extending therealong;

a second cavity formed in the jacket and extending therealong, a barrier portion of the jacket separating the second from the first cavity;

a first group of optical fibers located within and extending along the first cavity;

a second group of optical fibers located within and extending along the second cavity;

wherein the fiber optic cable is a high-density multi-fiber interconnect cable such that the cross-sectional diameter of the fiber optic cable is less than or equal to 4.0 mm while the cross-sectional areas of the first cavity and the second cavity are each at least 1.10 mm$^2$, and wherein the first and second groups of optical fibers each comprise six optical fibers.

12. The cable of claim 11, wherein the cross-sectional areas of the first cavity and the second cavity are each at least 1.25 mm$^2$.

13. The cable of claim 12, wherein the cross-sectional diameter of the fiber optic cable is less than or equal to 3.3 mm.

14. The cable of claim 13, wherein the first and second groups of optical fibers each comprise twelve optical fibers.

15. The cable of claim 14, wherein the packing density of each of the first and second cavities is about 70%.

16. The cable of claim 13, further comprising strength members arranged in both the first and second cavities and extending the length of the respective cavities, and wherein the strength members are arranged toward the center of the cable.

17. The cable of claim 16, wherein the strength members are aramid yarns arranged loosely in the respective cavities.

18. The cable of claim 5, further comprising a matrix material bundling optical fibers of the first and second groups.

19. The cable of claim 18, wherein the matrix material for one of the groups is a colored- or tinted-matrix material to help distinguish between the first and second groups.

\* \* \* \* \*